(12) United States Patent
Samma et al.

(10) Patent No.: US 12,515,405 B2
(45) Date of Patent: Jan. 6, 2026

(54) CUSTOM COLOR PRINTED FLEXIBLE STRUCTURE

(71) Applicant: Relatable Inflatables LLC, New Haven, CT (US)

(72) Inventors: Rabia Samma, Woodbridge, CT (US); Eman Samma, Woodbridge, CT (US); Ammar Samma, St. Petersburg, FL (US); Muneeb Samma, Woodbridge, CT (US); Tyler Crain, Oakland, CA (US); Aleksander V. Tropp, Old Greenwich, CT (US); Michael T. McClure, Shelton, CT (US)

(73) Assignee: Relatable Inflatables LLC, New Haven, CT (US)

( * ) Notice: Subject to any disclaimer, the term of this patent is extended or adjusted under 35 U.S.C. 154(b) by 318 days.

(21) Appl. No.: 16/926,142

(22) Filed: Jul. 10, 2020

(65) Prior Publication Data

US 2021/0008799 A1 Jan. 14, 2021

Related U.S. Application Data

(60) Provisional application No. 62/872,449, filed on Jul. 10, 2019.

(51) Int. Cl.
*B29C 64/336* (2017.01)
*B29C 64/393* (2017.01)
(Continued)

(52) U.S. Cl.
CPC .......... *B29C 64/336* (2017.08); *B29C 64/393* (2017.08); *B33Y 30/00* (2014.12);
(Continued)

(58) Field of Classification Search
CPC ................ B29C 64/336; B29C 64/393; B29C 64/209; B29C 64/118; B33Y 30/00; B33Y 40/00; B33Y 50/01; B33Y 70/00; B33Y 80/00
See application file for complete search history.

(56) References Cited

U.S. PATENT DOCUMENTS

| 5,009,626 A | 4/1991 | Katz | |
| 6,129,872 A * | 10/2000 | Jang | ........................ B29B 7/582 |
| | | | 425/162 |
| 6,672,933 B2 | 1/2004 | Stanier | |

(Continued)

FOREIGN PATENT DOCUMENTS

DE 202018105307 U1 10/2018

OTHER PUBLICATIONS

Gilboy, BMW, MIT Codevelop World's First 3D-Printed Inflatable Material, The Drive, https://www.thedrive.com/tech/21084/bmw-mit-codevelop-worlds-first-3d-printed-inflatable-material, May 25, 2018 (accessed Jan. 24, 2023) (Year: 2018).*

(Continued)

*Primary Examiner* — Andrew L Swanson
(74) *Attorney, Agent, or Firm* — Farber LLC (57) ABSTRACT

A three dimensional printing system which creates a multiple color printed structure which may be e.g. an inflatable likeness. The printing is done with a stretchy material such as silicone and is printed in layers of different color in order to match the designed likeness colors. In preferred embodiments, the 3d printing is done inside a gel suspension with a specialized print head which dispenses silicone in layers of color to produce the final desired color of silicone in the particular locations as determined by the avatar or likeness design.

18 Claims, 11 Drawing Sheets

(51) Int. Cl.
  *B33Y 30/00* (2015.01)
  *B33Y 40/00* (2020.01)
  *B33Y 50/02* (2015.01)
  *B33Y 70/00* (2020.01)
  *B33Y 80/00* (2015.01)
  *B29K 83/00* (2006.01)
  *B29K 105/00* (2006.01)

(52) U.S. Cl.
  CPC ............... *B33Y 40/00* (2014.12); *B33Y 50/02* (2014.12); *B33Y 70/00* (2014.12); *B33Y 80/00* (2014.12); *B29K 2083/00* (2013.01); *B29K 2105/0061* (2013.01); *B29K 2995/0026* (2013.01); *B29K 2995/0029* (2013.01)

(56) References Cited

U.S. PATENT DOCUMENTS

| | | | |
|---|---|---|---|
| 8,070,553 | B2 | 12/2011 | Carnegie |
| 2012/0252305 | A1 | 10/2012 | Sandholt |
| 2013/0238285 | A1 | 9/2013 | Volchek |
| 2015/0142159 | A1* | 5/2015 | Chang ............... B29C 64/112 700/119 |
| 2015/0375451 | A1* | 12/2015 | Voris ............... B29C 64/314 425/113 |
| 2016/0073719 | A1 | 3/2016 | Barad |
| 2016/0263827 | A1* | 9/2016 | Fripp ............... B29C 64/124 |
| 2018/0015668 | A1* | 1/2018 | Koskas ............... B29C 48/2886 |
| 2018/0022027 | A1* | 1/2018 | Powell ............... B33Y 40/10 239/139 |
| 2018/0071984 | A1* | 3/2018 | Lee ............... B01F 25/54 |
| 2018/0207863 | A1* | 7/2018 | Porter ............... B29C 64/40 |
| 2018/0281295 | A1* | 10/2018 | Tibbits ............... B29C 64/106 |
| 2019/0291350 | A1* | 9/2019 | Feinberg ............... A61L 27/443 |
| 2020/0147875 | A1* | 5/2020 | Asgeirsson ............... B29C 64/118 |

OTHER PUBLICATIONS

Dezeen, YouTube Video, https://www.youtube.com/watch?v=fBSSyXU2hmE, May 25, 2018 (accessed Jan. 24, 2023), screenshot taken from 0:23, video is embedded in Gilboy but is not shown in the attached printout of Gilboy (Year: 2018).*

Grammarist, Translucent vs Transparent, https://grammarist.com/usage/translucent-transparent/, Jul. 22, 2011 (from Internet Archive, accessed Jan. 25, 2023) (Year: 2011).*

Merriam-Webster, Opaque, Merriam-Webster, Mar. 24, 2019, https://www.merriam-webster.com/dictionary/opaque (Year: 2019).*

Creative Balloons mfg. inc .; Custom Shaped Foil Baloons; product website; https://www.creativeballoonsmanufacturing.com/custom-shape-foil-balloons/; retrieved from the internet on Apr. 4, 2019; 10 pages.

Skouras, Mélina, et al. "Designing inflatable structures." ACM Transactions on Graphics (TOG) 33.4 (2014): 1-10.

Above & Beyond Inc., www.giantad.com; Inflatables; http://www.giantad.com/store/index.php?route=product/category&path=18_90_91; retrieved from internet on Apr. 4, 2019.

2K Inflatables; "Custom Shapes", https://i2kplay.com/custom-inflatable-products/custom-shapes/; retrieved from Internet on Apr. 5, 2019; 10 pages.

Wang, Charlie CL, and Kai Tang. "Pattern computation for compression garment." Proceedings of the 2008 ACM symposium on Solid and physical modeling. 2008.

Garashi, Yuki, and Takeo Igarashi. "Pillow: Interactive flattening of a 3D model for plush toy design." International Symposium on Smart Graphics. Springer, Berlin, Heidelberg, 2008, 2 pages.

Skouras, Melina, et al. "Computational design of rubber balloons." Computer Graphics Forum. vol. 31. No. 2pt4. Oxford, UK: Blackwell Publishing Ltd, 2012; 4 pages.

* cited by examiner

CUSTOM COLOR PRINTED FLEXIBLE STRUCTURE

FIELD OF THE INVENTION

The following relates to customized design and construction of printed structures. More particularly, the following relates to a system and process which allows a user to create an inflatable likeness or other flexible printed item which is customized to the user's specifications. The following further relates to manufacturing processes for creating the inflatable likeness/flexible structure.

BACKGROUND OF THE INVENTION

Decorative inflatables are used in a variety of capacities including balloons for birthdays or other special occasions. A common type of inflatable is used e.g. for holiday decorations such as inflatable santas, frosty the snowman or other holiday characters or ornaments. However, these inflatable structures are mass produced and lack customization to the particular individual.

Some customized inflatable decorative structures are available, however, these tend to be cost prohibitive for the average person to acquire such an inflatable. For example, the many are familiar with parade floats such as those used in the Macy's Thanksgiving Parade or other inflatable balloon parades. Although these may be customized, they are individually sewn panels of different colors which require significant amounts of skilled labor to produce. Other smaller inflatables of a similar configuration are also available but similarly require specialized sewing and labor which ends up being cost prohibitive for the average person who wants to make an inflatable likeness for a special occasion or for some other purpose.

In addition, in the medical industry, the ability to custom print human like simulated organs or sleeves is useful, especially when the printing can be with customized colors which more accurately simulate human forms and possibly defects such as tumors or other diseased elements for teaching.

Therefore, there exists a need not only to enable a user to easily design an inflatable likeness or another likeness but for that user to be able to purchase and or manufacture such customized likeness for a reasonable cost. There also exists a need to be able to custom print such an item which is aesthetically pleasing and/or realistic or lifelike.

SUMMARY OF THE INVENTION

It would be more exciting and interactive for the consumer to be able to put their face on an inflatable Santa or to have an inflatable bride and groom at a wedding that guests can take amusing pictures with, or an inflatable can be made for the high school athlete as a look-alike to put on the parent's lawn. These are but a few amusing examples of how customized inflatables can be used. It would also be useful if the thin wall structure could be made as a customized mask, such as for Halloween costumes or other purpose.

In addition, decorative sleeves which simulate human skin are also desirable in a number of applications in the medical setting. For example, it would be useful if a prosthetic limb could be fitted with a thin walled sleeve which can be printed in color to match the user's skin tone. In other situations, it would be desirable for simulated organs to be able to be custom printed and designed to include, for example, simulated tumors or other structures which are useful from a teaching perspective.

It is therefore an object of the present invention to provide for customized inflatable structures or other forms which are designed to look like existing people.

It is another object of the invention to provide for a user interface, particularly an app based or web based interface where the user can develop a look alike animation representation and then create an inflatable or other structure from that representation.

It is further an object of the invention to provide the user the ability to custom design the inflatable (or other structure), edit the representation, and/or utilize a photo upload to create the inflatable (or other structure).

It is a further object of the invention to provide an inexpensive and repeatable manufacturing process which allows for reasonably priced manufacturing of customized inflatables or other customized human or human like forms or parts thereof.

These and other objects are achieved by providing a computerized user interface which is preferably web or mobile application based and allows a user to create a likeness or avatar of their desired customized inflatable. The avatar is then matched to available mold shapes or 3d printed and a head shape is created. The body shapes are matched to available shapes (or may also be created from sub-part molds) and are printed based on the avatar design. The head and body are then created (or chosen from stock) and joined together to create a customized inflatable.

In other aspects, 3d printing is used to create a custom printed inflatable likeness where printing is done with a stretchy material such as silicone and is printed in layers of different color in order to match the designed likeness colors. In preferred embodiments, the 3d printing is done inside a gel suspension with a specialized print head which dispenses silicone in layers of color to produce the final desired color of silicone in the particular locations as determined by the avatar or likeness design.

In one aspect a 3D printer for printing flexible structures comprises a base having a tank and a positioning support configured to move in at least three axes. A print head is connected to the positioning support and is configured to move with the positioning support. Feed reservoirs are plumbed to said print head and the print head has one feed reservoir for each dispenser element and the print head includes at least three dispenser elements. The feed reservoirs are each configured to be filled with a different color of a material and the three dispenser elements feed different amounts of the different colors of material from the feed reservoir out the print head based on a selected color associated with a print file such that at least two of the different colors are fed out the print head for a least a portion of a printed object made by the 3D printer.

In certain aspects a lamp is configured to activate to cure the material dispensed from the print head with light. In other aspects the print head is made of a material which is resistant to the light in order to inhibit curing of the material prior to the material it being dispensed from the print head. In certain aspects a computer receives the print file and instructs the positioning support to move based on the print file. In other aspects the print file is indicative of a plurality of layers each having a length and shape and along the length the print file is indicative of different combinations of print colors in order to allow the computer to control the different amounts of the material dispensed at the print head. In certain aspects the different combinations are each associated with a different amount of one or more of the colors in the at least three dispensers. In other aspects the tank holds a gel material which is different than the material fed out the print head. In still other aspects the gel material has a specific gravity which is +1-5% of a specific gravity of the material fed out the print head. In still other aspects the gel material is translucent or is transparent.

In certain aspects the computer generates a thin wall structure with a body having an interior surface and an exterior surface, the exterior surface defining a three dimensional undulating pattern and the body being made from silicone dispensed from the print head. The exterior surface has different color appearance in different locations thereon, the different color appearance is provided by layers of silicone of different colors. Each layer of silicone is a constant color and the color appearance is made different in the different locations by varying a thickness of each of the layers.

In certain aspects the feed reservoirs are plumbed by air pressure which acts on a plunger associated with the dispenser to feed the material out the print head.

In yet other aspects a thin wall structure is provided including a body having an interior surface and an exterior surface, the exterior surface defining a three dimensional undulating pattern and the body being made from silicone. The exterior surface has different color appearance in different locations thereon, the different color appearance is provided by layers of silicone of different colors. Each layer of silicone is a constant color and the color appearance is made different in the different locations by varying a thickness of each of the layers in order to achieve a desired color.

In certain aspects a second body is inflatable and is connected to the body which is also inflatable.

In other aspects a printed silicone structure comprises a body having an exterior surface, the exterior surface defining a three dimensional undulating pattern and the body being made from silicone. The exterior surface having different color appearance in different locations thereon, the different color appearance is provided by layers of silicone of different colors, wherein each layer of silicone is a constant color and the color appearance is made different in the different locations by varying a thickness of each of the layers in order to achieve a desired color. The layers are provided in a plurality of two dimensional slices of material having varied outer perimeters and the desired color changes around each perimeter.

In other aspects the body is a thin walled hollow structure. In other aspects the body is a solid structure.

In yet other aspects a method is used for providing a customized human form structure comprising one or more steps of: providing a user interface which is displayed on a computer which allows a user to configure a custom representation; receiving selections from the user via said user interface in order to display the custom representation as a rendered drawing on the computer; converting the custom representation into a print file via the computer; and printing the print file with a printer using a material to make a three dimensional print of the custom representation which is hollow and thin walled.

In certain aspects the three dimensional print is custom color printing of a standard shape. In other aspects the printer is a 3D printer which further includes a positioning support which is configured to move along at least three axes and a print head attached to the positioning support. The print head includes at least three dispensers which feed liquid silicone of different colors. In certain aspects the printer includes a tank holding a gel material which is a different material than the liquid silicone. In still other aspects when printing, the dispensers feed the liquid silicone in different quantities based on a color required based on the print file in a location of the inflatable which is being printed. In certain aspects the computer includes at least two computers connected via a network or other communications methods. In still other aspects the step of printing includes feeding three or more colors of material in different quantities at different locations on the inflatable to provide different colors at the different locations. In yet other aspects, the method includes curing the material which may be done with a UV light source. In still other aspects the printing is done in a tank containing a second material different from the material. In certain aspects the curing includes curing the material with a UV light source wherein the second material is not cured by the UV light source. In other aspects the method includes securing the inflatable printed structure to a second structure which is also inflatable. The curing could also be moisture curing, heat curing in addition to the UV and combinations of the same can be used as well.

In certain aspects the method includes providing a fan which is configured to secure to the inflatable such that when activated, the fan inflates the inflatable, wherein the fan and inflatable are packaged together within packaging.

In certain aspects the user interface allows the user to upload a photograph and the computer, based on said photograph, prepares the custom representation. In still other aspects the user interface allows the user to edit the custom representation which is prepared based on the photograph.

In other aspects a method is provided for generating a print file for full color 3d printing comprising one or more of the steps of: providing a three dimensional model of a part to be printed; processing said three dimensional model with a computer by slicing said three dimensional model into a plurality of layers with each layer having a layer pathway; assigning with said computer two or more colors along one or more of said plurality of layers such that the layer pathway is further associated with different colors along the pathway to create colored layer pathways; converting, with said computer, the colored layer pathways into dispensing signals which are transmitted to a controller to dispense three dimensional printing material of two or more colors.

In certain aspects the assigning includes separating the colored layer pathways into CMYK color components and the dispensing signals are indicative of an amount of each of the CMYK color components to be dispensed along the pathways at particular locations along the pathways. In other aspects the dispensing signals are coordinated with position signals associated with the layer pathways and the position signals are transmitted to a position controller to move a print head which dispenses the three dimensional printing material.

Other objects of the invention and its particular features and advantages will become more apparent from consideration of the following drawings and accompanying detailed description.

DETAILED DESCRIPTION OF THE INVENTION

Referring now to the drawings, wherein like reference numerals designate corresponding structure throughout the views. The following examples are presented to further illustrate and explain the present invention and should not be taken as limiting in any regard.

Figure 1:
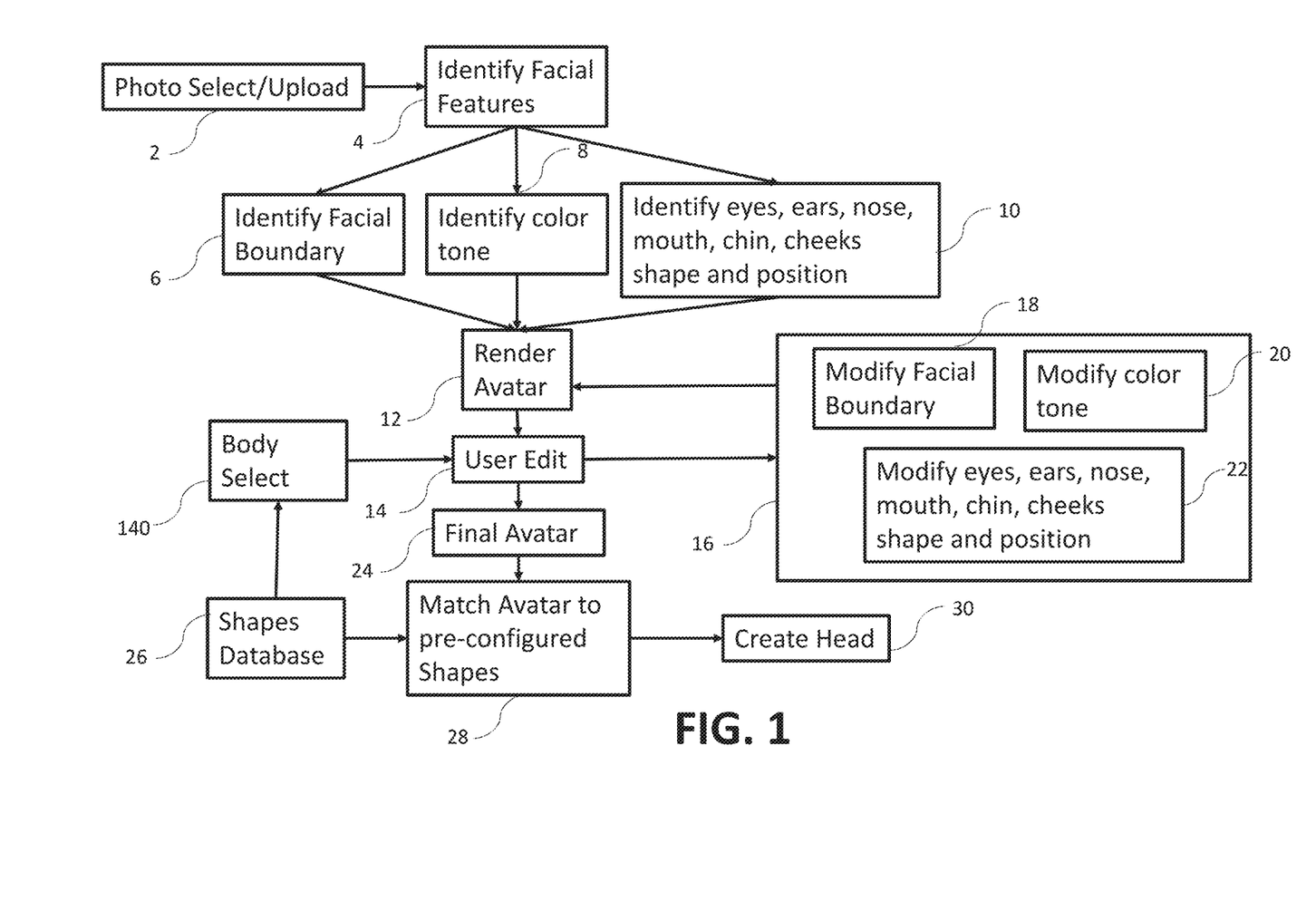
FIG. 1 is a functional flow diagram according to the present invention.

In FIG. 1, a photo 2 is provided to the application or web interface by selection, upload or, if a mobile device is being used, the user can take the photo at the time they are creating the avatar. The software of the web interface/application then identifies facial features and shapes in the photo. For example, eyes, ears, nose, mouth, chin, cheeks and their shape and position 10. The skin color tone 8 and facial boundary 6 are also identified. It is understood that these are exemplary facial features and that others can be identified by the facial recognition software. Using these features, the avatar 48 is rendered 12 and displayed to the user. The user can then edit 14 modifying 16 the boundary/shape 18, color tone 20, position/size of other facial features 22. The user can also select the body 140 from pre-configured bodies (or a full body photo can be used to select a body shape. The body shape can have pre-selected clothing such as a tuxedo or football pads or other clothing types or body shape/build types. In certain cases, the user can select different colors and designs for printing on the body and in other options, the user is provided with a more limited number of standard body types. The software may provide for different tiers of customization available which come at increasing cost. The body is typically selected from available shapes databases 26 which could contain a number of different body shapes such as Adult Male, Adult Female, Child Male, Child Female. Within these categories, different shapes can characteristics can also be provided as options. Once the body is selected and the user is finished editing 16 the head, the final avatar 24 is displayed to the user who would still have the option of reverting back to previous steps to make further modifications. The avatar is then matched to pre-configured shapes from the shapes database 26, particularly head shapes or shapes of features within the head. Then the head is created 30.

Figure 2:
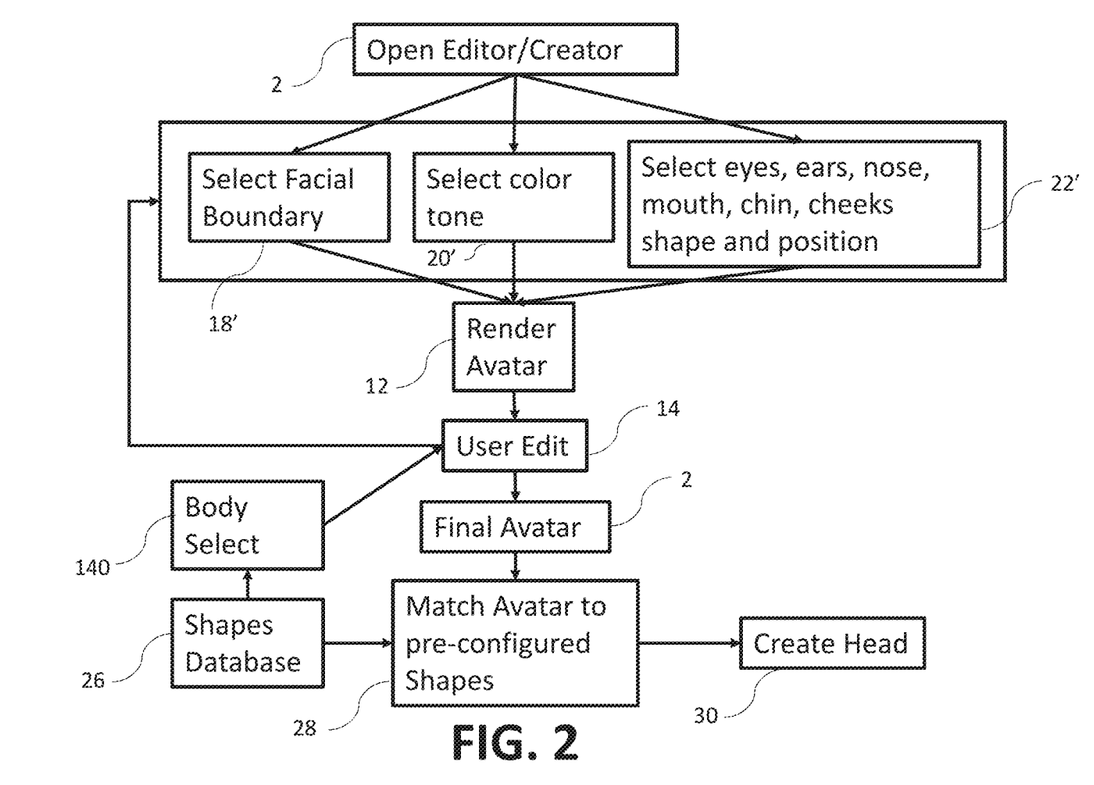
FIG. 2 is a functional flow diagram showing an alternative way to create the avatar.

FIG. 2 shows a similar approach to FIG. 1, but instead of a photograph being used to identify the facial features, the user starts 2 from the editor and selects the various features/shapes 18', 20', 22' to create the avatar 12 and edit it 14.

Figure 3:
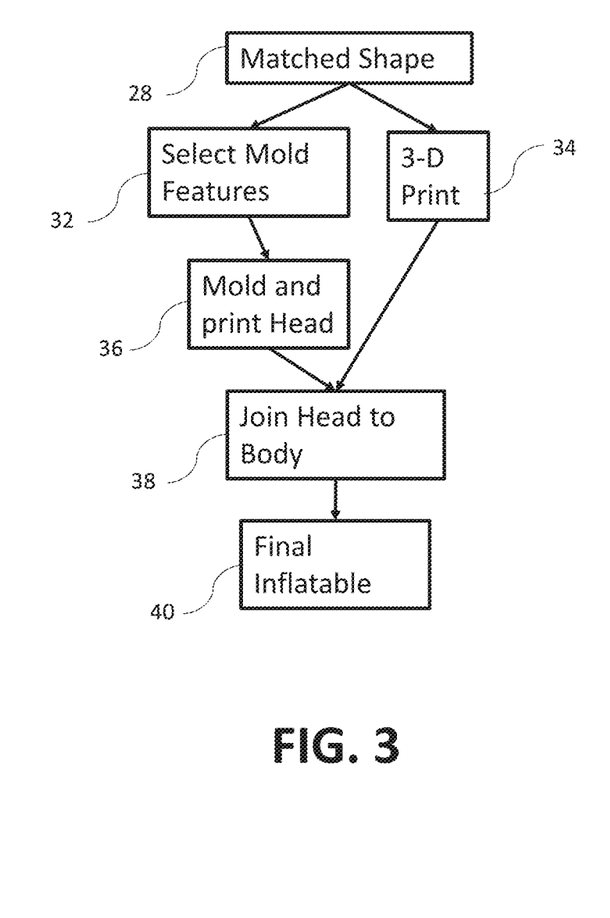
FIG. 3 is a functional flow diagram showing the process of creating and assembling the customized inflatable of FIGS. 1-2.

As shown in FIG. 3, to create the head 30, the match of shapes 28 is used to select mold features 32. The mold may be a temporary or adaptive mold made from multiple parts having different shapes and codes. For example, if the nose category of shapes is A and there are 20 different nose shapes available, A1, A2, A3, A4 etc could be selected, depending on the matching 28. The mouth may be B category with 10 shapes available. The same holds true for ears, eyes, mouth, chin and other features. These sub-parts of the mold can be selected so that e.g. Nose A3 is combined with mouth B1 and the corresponding mold pieces are chosen and put into a holder which is then used to mold the head from vinyl or other moldable plastic materials. The head is then molded (and printed) 36 to provide for a likeness which closely matches the designed avatar shape. It is further understood that in the process of creating the head 30 that a rendering of the final inflatable is shown to the user as the avatar and the final inflatable are unlikely to match exactly in that the nose selected may be close to 2-3 of the available nose molds. The rendering of the final inflatable can allow the user to select between these narrowed down choices for molds and modify the rendering accordingly. This would be done in a similar way to FIG. 4, but with fewer options available to the user at this point since the final avatar was already created and the matching 28 done.

As another option, 3-D printing 34 can be used to create the head. The body having been selected from a range of available body blanks is joined to the head 38. The body can also be provided with a fan and electrical connection to blow up the inflatable. At this point, the inflatable is finalized 40 and ready to ship to the user.

Figure 4:
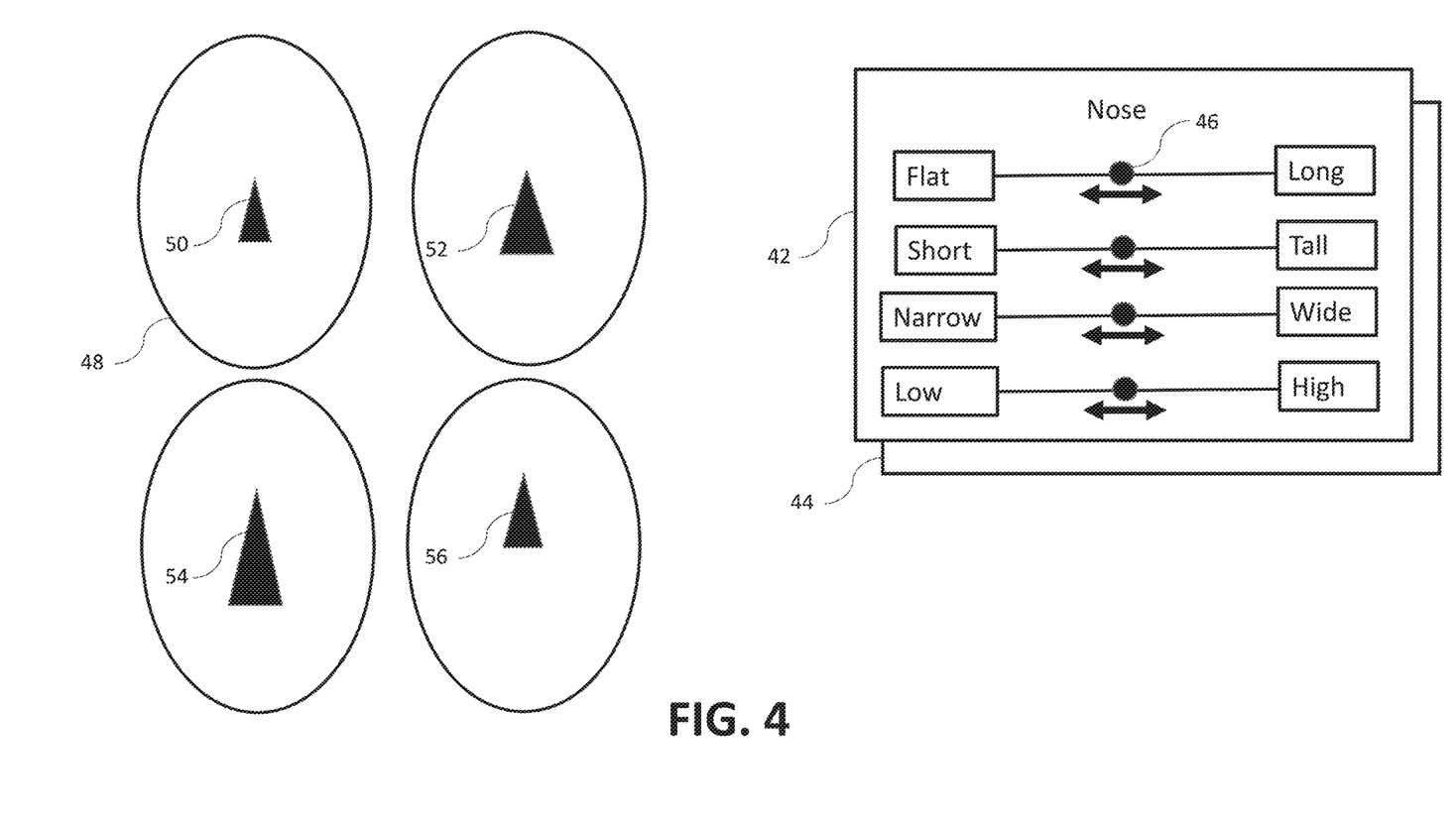
FIG. 4 shows a representative user interface for design/edit/modification of the avatar which becomes the customized inflatable of FIGS. 1-3.

FIG. 4 shows an example user interface for nose selection. Sliders 46 are provided to allow the user to modify the nose 50, 52, 54, 56 and depending on the selection a different render 48 is shown (four are displayed for illustration purposes, but typically only one would be displayed). It is understood that other feature dialogues 44 can be provided for different facial features (basic face shape, mouth, eyes, ears etc). A similar user interface can be used for the different selection and/or modification processes described herein. Further, when the avatar is finalized and shapes matched 28, a similar interface can be displayed with fewer ranges of options which were matched 28 to be the closest to the final avatar, thus the user can choose from a narrowed selection of available facial features which were identified to be possible matches. Although two dimensional display is shown, it is understood that a 3d rendering can be visible, e.g. so that the length of the nose can be seen by the user and so a profile view can be looked at for editing. It is understood that other selection options (other than the slider bars) can be utilized to enable the user to design the avatar which forms the basis of the customized inflatable.

Figure 5:
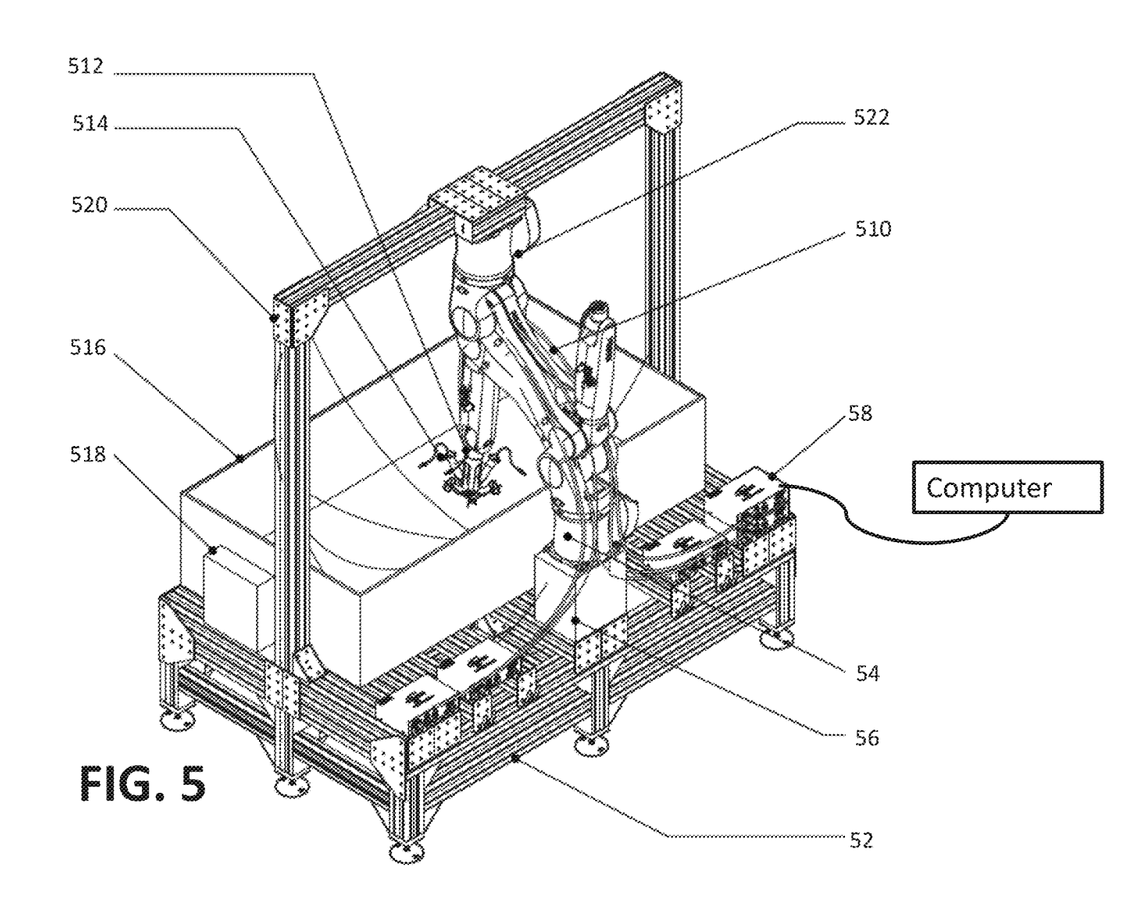
FIG. 5 is a rear perspective view of a 3d print machine according to the present invention.

FIG. 5 shows an exemplary 3d printer according to the present invention. The base of the machine 52 has the positioning support 56 which includes a robotic arm 54 which can move the print head 512 in three axis planes (up/down, left/right, forward/back). It is contemplated that additional axes of movement (such as rotation/twist) could be provided with the arm to provide greater flexibility, for example, a 5 axis arm could be used. Dispenser pump 58 and plumbing 510 controls delivery of the material which makes up the inflatable structure to the print head 512. The dispenser pump 58 and the dispensers 514 feed calibrated amounts of the material through the print head to create the inflatable structure. As shown, there are four dispensing pumps 58 and four dispensers 514 at the print head 512 which is connected to the print arm 522. Frame 520 is also provided and may be used in the case that top mounting of the robotic arm is desirable or in the case that different robotic arms or other positioning devices are utilized. In preferred embodiments, liquid silicone is used in the dispensing pumps 58 and each dispensing pump feeds a different color of silicone. The dispenser pump 58 may provide calibrated air pressure via plumbing 510 to press on the syringe plunger structure of the dispenser 514. The reservoir of the dispenser 514 contains the liquid silicone material which is dispensed according to the print file. Preferably at least some of the colors of silicone are translucent or transparent. For example, a clear silicone base may be tinted in order to provide the different material colors fed through the pumps/dispensers. The print head will move within a tank 516 which is preferably filled with a gel or liquid material which is different from the material which makes up the inflatable structure. Typically, a printed structure will include a white base layer and then additional colored layers attached to the white base layer.

The tank 516 is shown with four walls and a bottom much like a fish tank. Other tank shapes are contemplated too. The tank 516 may or may not be clear, or transparent/translucent. Lamps 518 are also provided on the tank 516 and these lamps direct light towards the printed material. Preferably, the lamps provide UV light and the printed material is a silicone which cures in response to UV light. The print head 512 and dispensers 514 along with the plumbing 510 are UV resistant or opaque in order to block UV light and inhibit the silicone material from curing inside the print head 512 or reservoirs/dispensers. As a result, once the silicone material exits the print head, it is acted upon by UV light and begins to cure. Preferably, the lamp 518 is mounted to the outside of the tank 516 and the tank material does not substantially inhibit UV light from passing therethrough. In certain cases, substantially none of the UVA, UVB, UVC spectrums of light are inhibited by the tank material. In other cases, two or fewer of these spectrums are inhibited. For example, most glass will substantially inhibit UVB light.

As mentioned, the tank 516 is filled with a suspension/support material such as a gel or liquid. This material provides support for the printed silicone after being dispensed and during curing in order to avoid distortions or collapsing of the structure. The end inflatable is roughly of a constant thickness and in preferred embodiments will be a representation of a human head. Accordingly, the silicone being flexible means that the gel is helpful to constrain movement of the printed silicone during the printing process. In certain aspects this material is a sodium polyacrylate mixture preferably 3:1000 parts sodium polyacrylate:water. It is contemplated that a range of 1-20:1000 parts, more particularly 1-10:1000 parts or even more particularly 1-5:1000 parts mixture can be used. This mixture creates a gel which is preferably transparent or at least translucent. Other mixtures are contemplated, but the gel forming material needs to be non-reactive to silicone and ideally can easily be cleaned with water and thus wash off without too much effort. Because the gel forming material is non-reactive with silicone, this allows the printed silicone layers to cure. The specific gravity of the gel forming material is preferably +/−5% of the silicone or printing material, more preferably +/−4% or even more preferably +/−2%. As a result, the gel mixture acts to support the silicone but tends not to mix with it during curing. The transparent nature of the gel is also important in that UV light curing needs to react with the silicone or print material through the gel. Generally, the viscosity of the gel mixture is roughly in the 11,000 centipoise range, optionally 8,000-16,000 centipoise. Silicone or other print materials used herein preferably have a viscosity prior to curing of 90,000-550,000 centipoise.

The support 56 and robotic arm 54 along with the dispensing pumps 58 and the dispensers 514/print head 512 are all controlled by a computer. Preferably, the computer is supplied with a print file which is indicative of the shape and colors and location of colors of the desired inflatable structure which has been custom designed. The print file may be generated based on the process and user interface described with respect to FIGS. 1-4.

Figure 6:
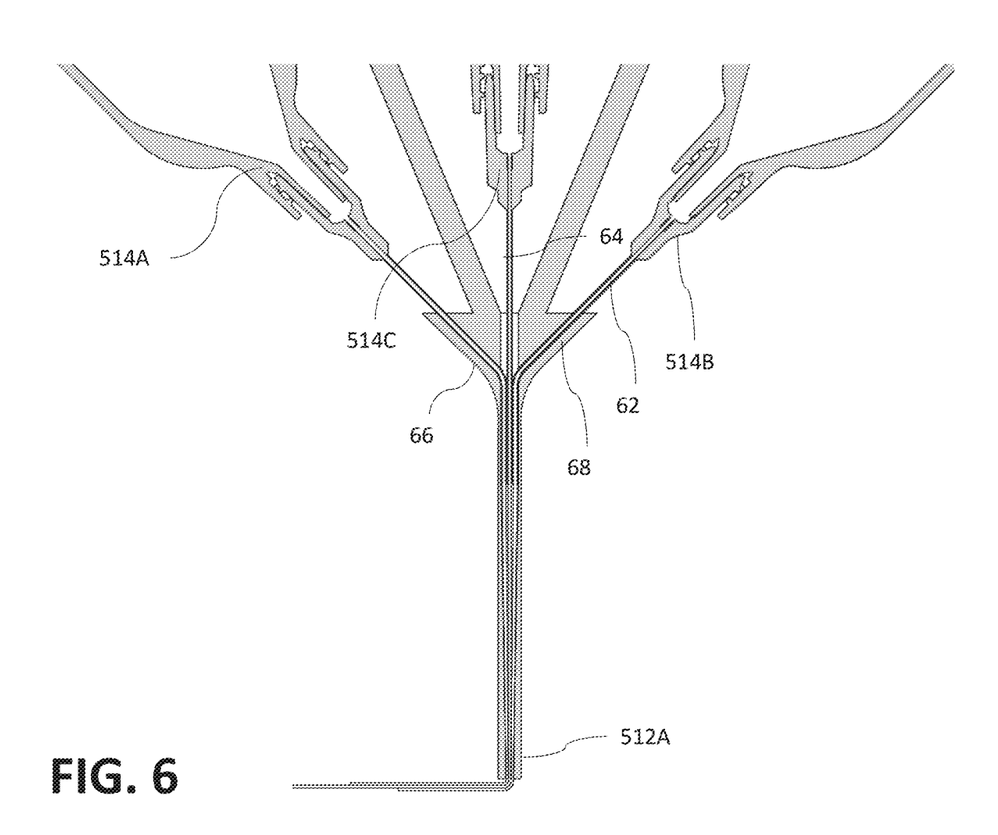
FIG. 6 is a cross section detail view of FIG. 5
Figure 7:
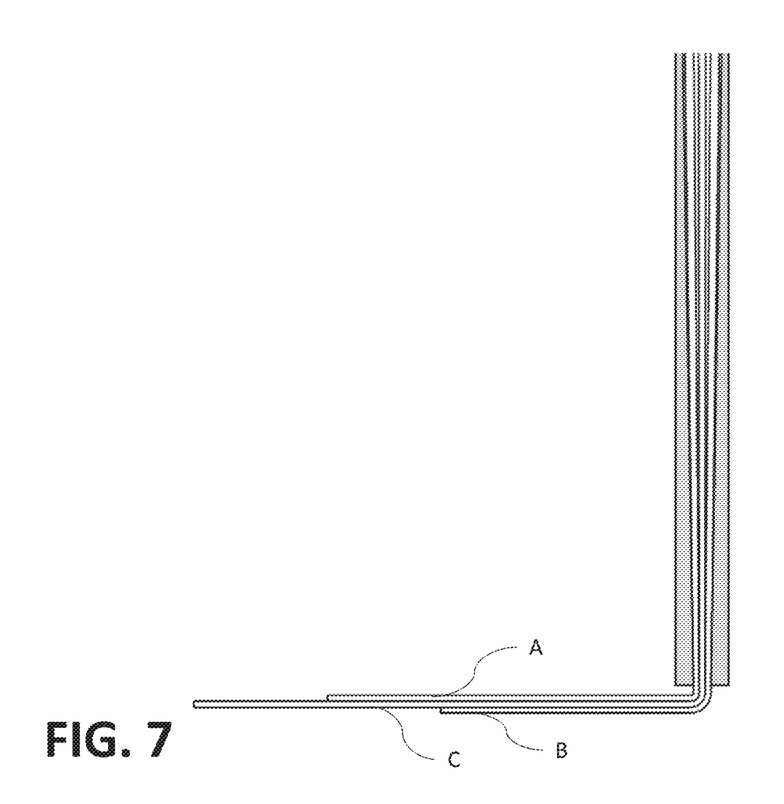
FIG. 7 is a cross section detail view of FIG. 6.

FIG. 6 shows additional detail on the dispensers 514 and three are shown in FIG. 6 (514A, 514B, 514C). Each dispenser is associated with a different color and the dispenser 514 is configured like a syringe with narrowed tubes 62, 64, 66 which feed a common tube or nozzle 68 out print head end 512A. As a result, a three layer printout is made (FIG. 7) including layers A, B and C with C sandwiched between A and B. Since each layer is a different color and preferably at least layers A and B are translucent or preferably all layer are translucent, the 3d printer provides color layers which when combined provide the appearance of what would be the resulting color if the proportions of the individual colors were mixed. This is somewhat similar in theory to how older style 3 or 5 color printing presses worked to provide a particular color in particular locations, but applied to silicone and 3d printing. It is understood that CMYK printing in this situation preferably uses cyan, magenta, yellow, black and white silicone. Traditional ink jet printers on paper utilize only the CMYK colors and rely upon the white color being present in the paper on which the print is being made. In this situation, the white will also be printed as a base layer with the CMYK colors layered thereon in order to provide the color that is desired in the particular location on the printed structure. In certain embodiments the inner surface of the printed structure is of the white base material and then the variation of amounts of the CMYK colors are printed on top of this white material to result in the final color. The thickness of each of the CMYK layers can also be varied in proportion to the desired color and its associated CMYK value.

Figure 8:
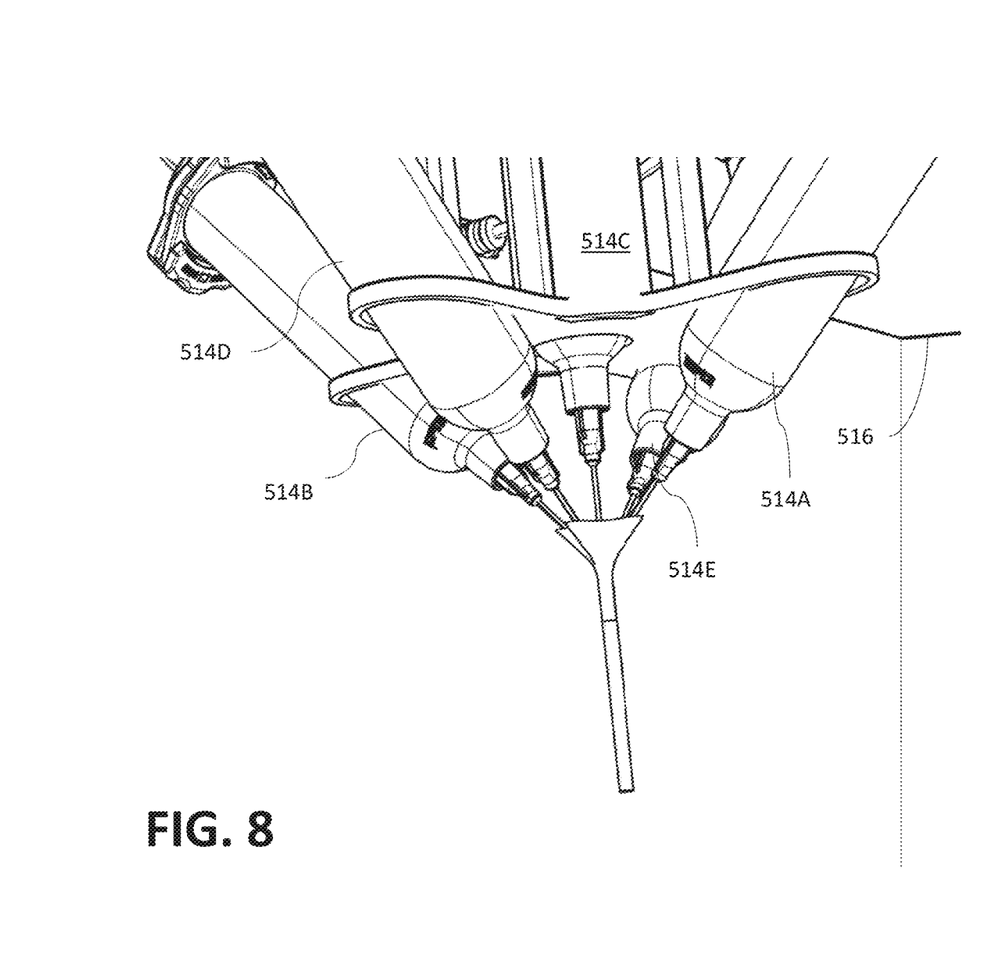
FIG. 8 is a perspective detail view of FIG. 5.
Figure 9:
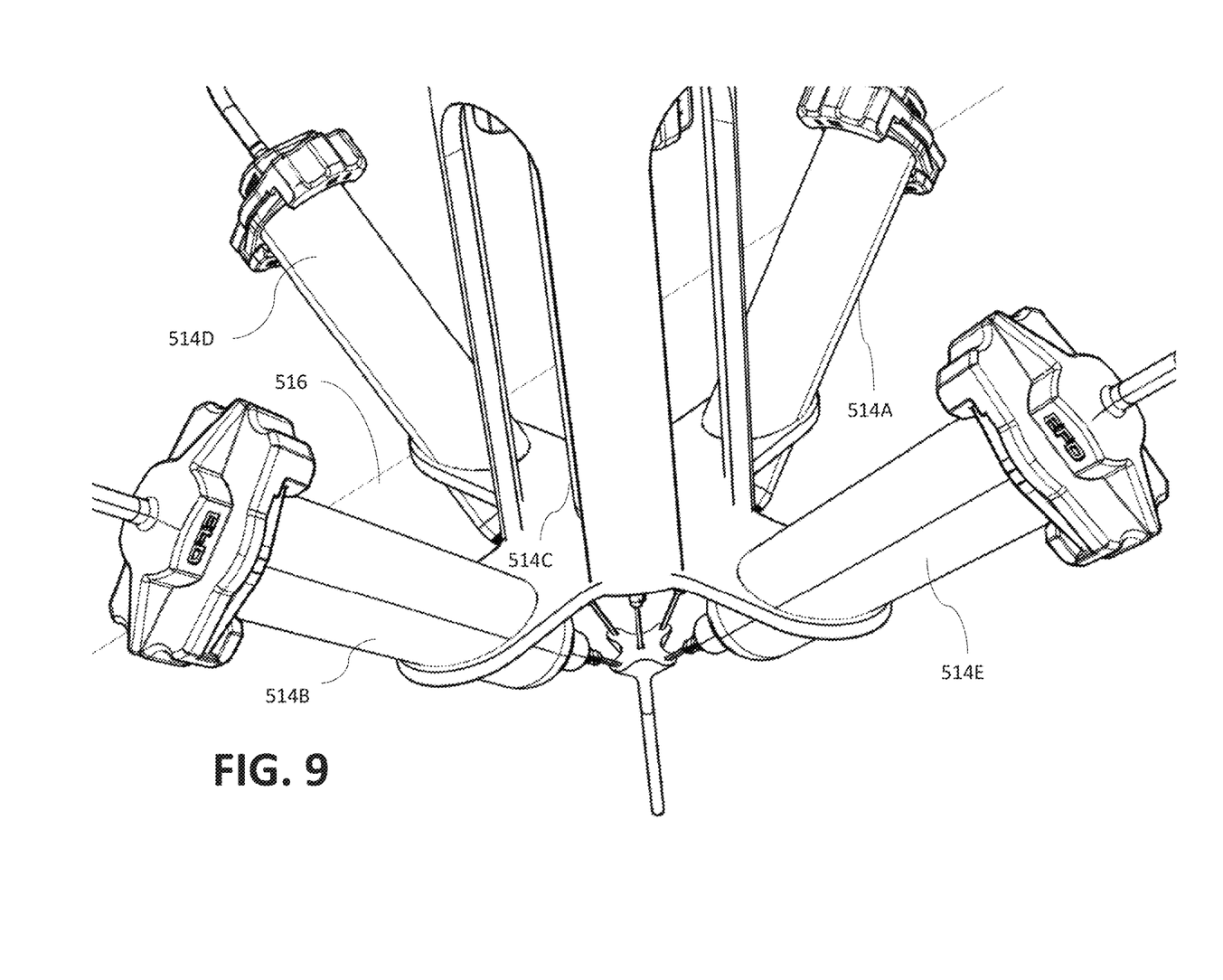
FIG. 9 is a top perspective detail view of FIG. 5.

FIG. 8-9 shows an embodiment of the print head 512 where a 5 color print is provided, namely 514A-E are different colors. In certain embodiments layer C associated with dispenser 514C is the middle layer and is always white.

Figure 10:
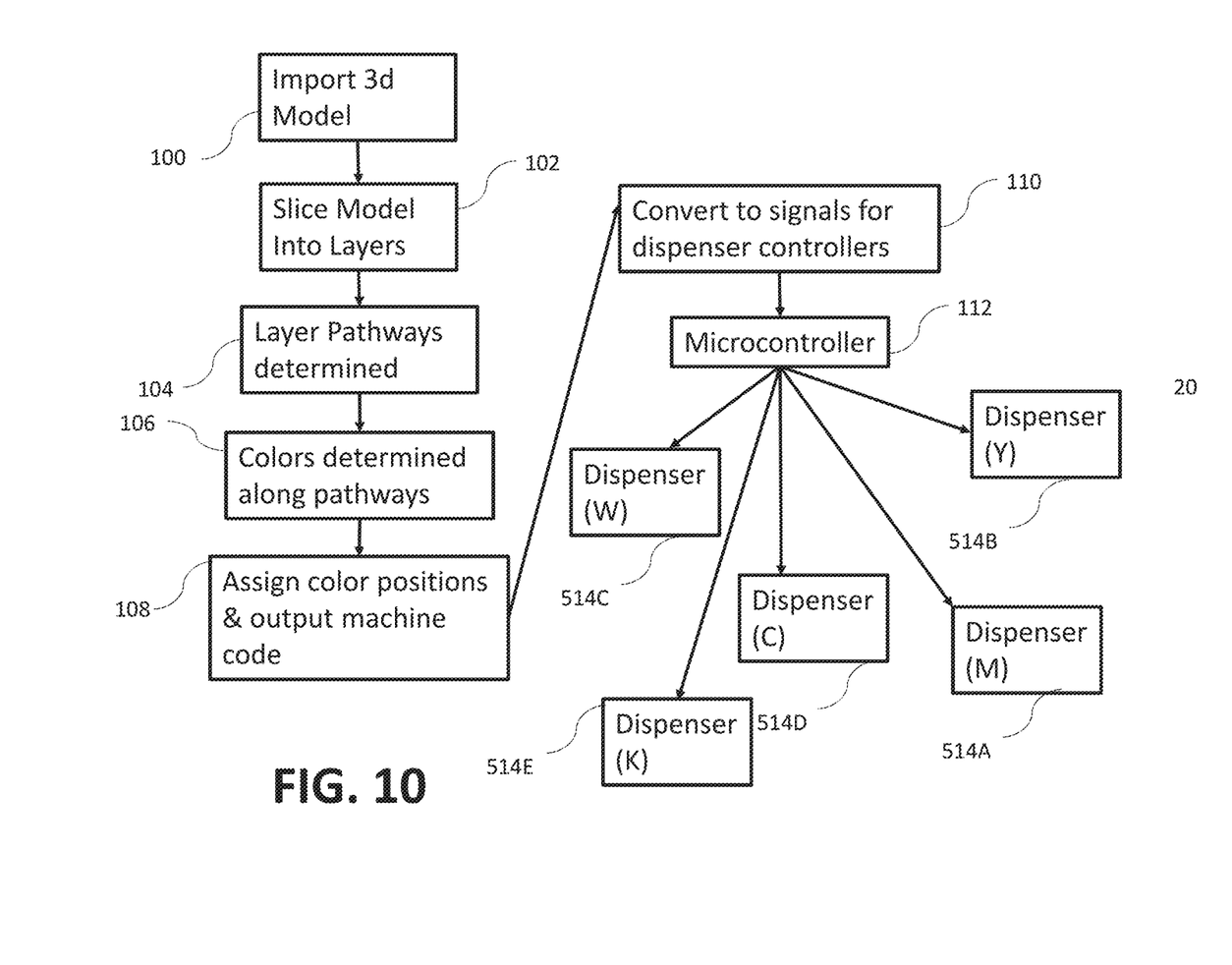
FIG. 10 is a functional flow diagram showing how the print file to operate the printer of FIG. 5 is created.

FIG. 10 shows the process of converting a 3d model to a print file for execution on the 3d printer. As shown, a 3d model is provided, optionally via the interface described in FIG. 1-4. The 3d model is parsed into layers or slices which make up the layers and path the 3d printer will take. For each layer color is determined based on location on the layer and this color is broken into its CMYK values. Each layer is configured either as a strand or a loop and that thin layer will have varied color throughout. The print file needs to break down these colors into the desired CMYK values which then is indicative of how much (e.g. how thick) the silicone of the particular color will be when printed out the print head. By varying the color tones, layer thicknesses, color combinations or depths of colors of the different color layers, the perceived color will change accordingly. However, if the print is based on a high resolution photo, the thickness of the individuals could be optimally constantly changing in order to provide the highest resolution. This may greatly slow the printing process. Therefore, in order to reduce the print resolution in order to speed printing, a threshold may be set based on calculated CMYK values such that the print file will instruct the printer to print a certain combination of CMYK for a certain distance on the strand/loop of a layer until the image or design the print file is based on results in a certain percentage or other threshold change in one or more of the CMYK values.

As shown in FIG. 10, the 3d model is imported 100 and software creates two dimensional slices 102 and determines pathways 104 much like a traditional 3d printer. However, these layers have varied colors and the colors along the pathways are determined 106 and then positions along those pathways 104 are assigned 108 to output machine code. This code is then converted 110 into signals for the dispenser controllers 58. A microcontroller sends these signals to the controllers 58 to result in the dispensers 514A-E dispensing the liquid silicone out the print head. The thickness in the various layers will be modified depending on the ultimate color required along the particular pathway 106. The signals to the controllers 58 will indicate different feed rates for the different colors provided and this feed rate will depend on where the positioning support and print head are located and will further account for the length of the tube/nozzle 68 to ensure that the proper color is calibrated to exit the print head 512A at the correct time and location for the position of the print head. Thus, the print file coordinates the color instructions with the movement instructions to provide the customized 3d printed structure. In the case where more solid parts are being made, the center of the slice of the 3d model may be filled with a solid color. In this case, it may be more efficient to add another dispenser which is filled with the specific color which makes up the majority of the interior of the part. It is also contemplated that this interior could be printed primarily in white material and then as the printer reaches the perimeter of a particular slice, the CMYK colors will be added at the correct proportions.

Figure 11:
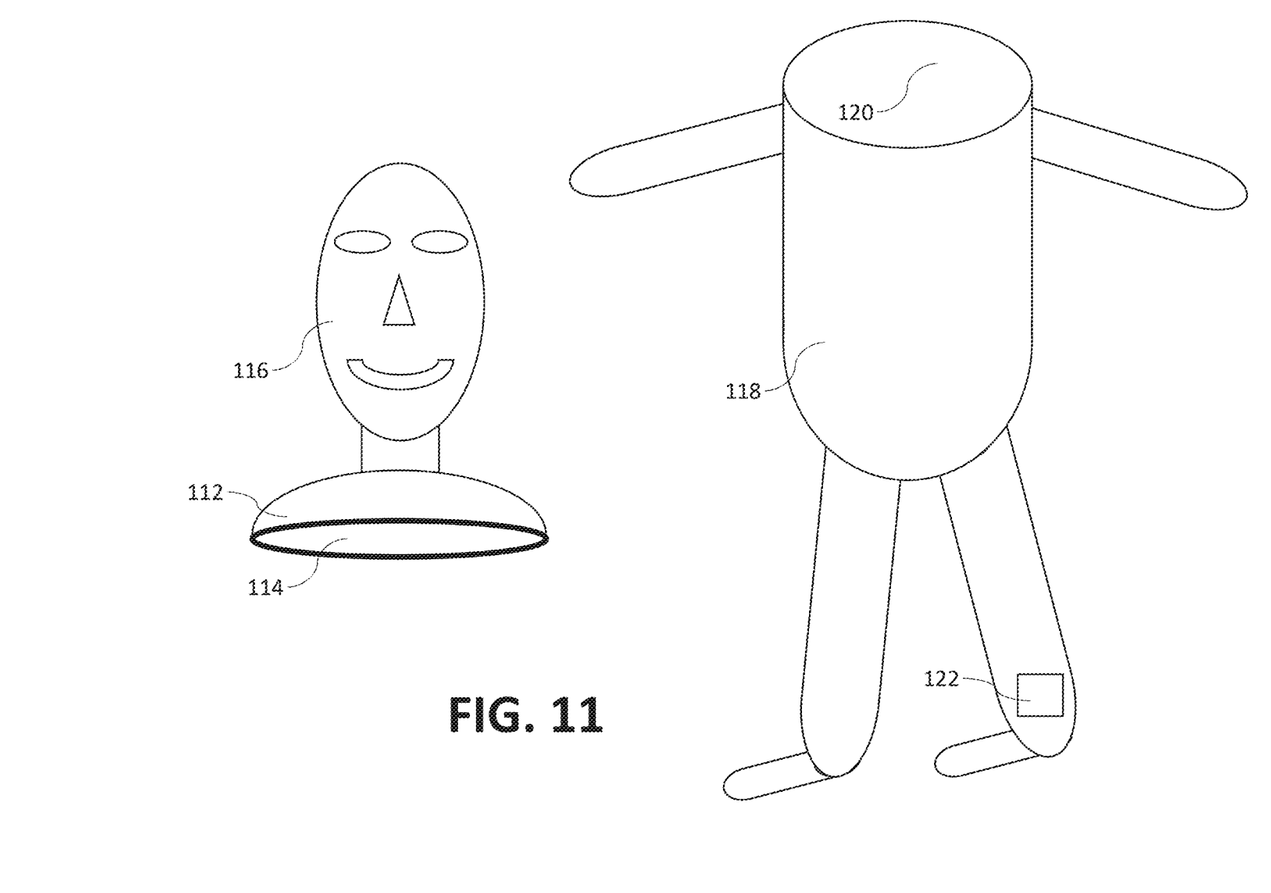
FIG. 11 shows a representation of a 3d printed structure which may be created by the printer of FIG. 5.

FIG. 11 shows a printed head with the outer surface 112 and inner surface 114 creating a thin walled structure which may also be inflatable. In preferred embodiments, the thickness of the thin walled structure is less than 0.5 inches, more preferably less than 0.25 inches. The thin walled structure will typically be of a thickness in the range of 0.1-2.0 mm, more particularly 0.2-1.5 mm more particularly 0.25-0.8 mm even more particularly 0.3-0.6 mm and even more particularly about 0.45 mm. Also shown is the body part with outer surface 118 and inner surface 120 which may be attached to the printed head, e.g. by glue or Velcro or other securing systems. Fan 122 may be provided to inflate the combined structure in that the printed head part may be added to the body part. Alternately, the body part could be printed according to the present invention as part of the head. It is understood that the face 116 of the body may have a different color appearance than e.g. the neck/shoulder area 112 and that this may be accomplished using the printing in layers with different colors around the layers according to the 3d model design. The 3d model would be understood to be a file which is a computer representation of the head part as shown in FIG. 11.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A 3D printer for printing flexible structures comprising:
   a base having a tank;
   a positioning support configured to move in at least three axes;
   a print head connected to the positioning support and configured to move with the positioning support, wherein the print head includes at least three dispenser elements which at least three dispenser elements move with the print head;
   feed reservoirs plumbed to said print head wherein said print head has one feed reservoir for each of the at least three dispenser elements;
   a controller configured to control the print head and feed reservoirs based on a print file, wherein the feed reservoirs are each configured to be filled with a different color of a material and the controller configured to control the three dispenser elements to simultaneously feed different amounts of the different colors of material from the feed reservoir out the print head in substantially different layers based on at least first and second selected colors associated with the print file, the first selected color associated with the print file created by at least three of the different colors are fed simultaneously out the print head for a least a portion of the flexible structure which is a printed object made by the 3D printer in a first ratio of the three different colors, and the second selected color associated with the print file created by at least three of the different colors which are fed simultaneously out the print head for a least a second portion of the printed object made by the 3D printer in a second ratio of the three different colors, wherein the material of at least two of the feed reservoirs, when cured, is translucent such that a perceived color from an exterior of the flexible structure is varied according to the different amounts of the different colors of the material and wherein the different layers are arranged relative to each other across to a build direction of the flexible structure;
   a fourth feed reservoir containing a white material and fourth dispenser wherein the controller is further configured to print a fourth layer in the white material for a most interior layer of the flexible structure.

2. The printer of claim 1 further comprising:
   a lamp which is configured to activate to cure the material dispensed from the print head with light.

3. The printer of claim 2 wherein the print head is made of a material which is resistant to the light in order to inhibit curing of the material prior to the material it being dispensed from the print head.

4. The printer of claim 1 further comprising:
   a computer which receives the print file and instructs the positioning support to move based on the print file.

5. The printer of claim 4 wherein the print file is indicative of a plurality of layers each having a length and shape and along the length the print file is indicative of different combinations of print colors in order to allow the computer to control the different amounts of the material dispensed at the print head.

6. The printer of claim 5 wherein the different combinations are each associated with a different amount of one or more of the colors in the at least three dispensers.

7. The printer of claim 1 wherein the tank holds a gel material which is different than the material fed out the print head.

8. The printer of claim 7 wherein the gel material has a specific gravity which is +/−5% of a specific gravity of the material fed out the print head.

9. The printer of claim 8 wherein the gel material is translucent.

10. The printer of claim 8 wherein the gel material is transparent.

11. The printer of claim 6 wherein the printer generates a thin wall structure with a body having an interior surface and an exterior surface, the exterior surface defining a three dimensional undulating pattern and the body being made from silicone dispensed from the print head;

the exterior surface having different color appearance in different locations thereon, the different color appearance is provided by layers of silicone of different colors, wherein each layer of silicone is a constant color and the color appearance is made different in the different locations by varying a thickness of each of the layers.

12. The printer of claim 1 wherein the feed reservoirs are plumbed by air pressure which acts on a plunger associated with the dispenser to feed the material out the print head.

13. The printer of claim 1 further comprising a nozzle connected to each of the at least three dispenser elements at one end and the nozzle comprises a second end, and at the second end of the nozzle material from the at least three dispenser elements is fed simultaneously.

14. The printer of claim 13 wherein the selected color associated with the print file causes at least three of the different colors to be fed out the print head as layers of the different colors which vary in thickness based on the print file.

15. The printer of claim 1 wherein the at least three dispenser elements comprise at least five dispenser elements, each of the at least five dispenser elements include a different color.

16. The printer of claim 13 wherein the at least three dispenser elements each include a different color material selected from the group consisting of: cyan material, magenta material, yellow material, white material and black material.

17. The printer of claim 1 wherein the feed reservoirs are stationary with respect to the base.

18. The printer of claim 1 wherein the controller includes a threshold set based on calculated CMYK values such that the print file is configured to provide instructions to the printer to print a certain combination of CMYK for a certain distance of one or more of the layers until the image or design the print file is based on results in a change in one or more of the CMYK values above the threshold.

* * * * *